United States Patent [19]

Geyer

[11] 4,148,469
[45] Apr. 10, 1979

[54] DUAL RATE SPRING WITH ELASTIC SPRING COUPLING

[75] Inventor: Robert P. Geyer, Palatine, Ill.

[73] Assignee: Standard Car Truck Company, Chicago, Ill.

[21] Appl. No.: 871,449

[22] Filed: Jan. 23, 1978

[51] Int. Cl.² ............................................. F16F 1/12
[52] U.S. Cl. ...................................... 267/4; 267/168; 267/179
[58] Field of Search ...................... 267/4, 60, 168, 179

[56] References Cited

U.S. PATENT DOCUMENTS

| 119,254 | 9/1871 | Vose | 267/4 |
|---|---|---|---|
| 531,910 | 1/1895 | Cloud | 267/4 |
| 1,124,746 | 1/1915 | Kadel | 267/4 UX |
| 1,429,146 | 9/1922 | Karge | 267/168 X |

FOREIGN PATENT DOCUMENTS 1391845  2/1965  France ........................... 267/179

Primary Examiner—Duane A. Reger
Attorney, Agent, or Firm—Kinzer, Plyer, Dorn & McEachran

[57] ABSTRACT

A supportive spring system particularly adaptable to vehicles such as railway cars that are operated with widely variable loads from empty to fully loaded condition. Such a spring system utilizing a plurality of helical spring units comprises multiple nested springs with primary springs having greater axial length than one or more secondary springs so that the primary springs alone provide the necessary supportive capacity to yieldingly support the weight due to an empty or slightly loaded car. When cars are heavily loaded, the secondary springs also become supportive and all sets of springs act in unison. To prevent the secondary springs from bouncing and becoming misaligned due to the vehicle's movement on the track, the lower coterminating end coils of the primary and secondary springs are yieldingly bonded together by an elastomeric material.

5 Claims, 4 Drawing Figures

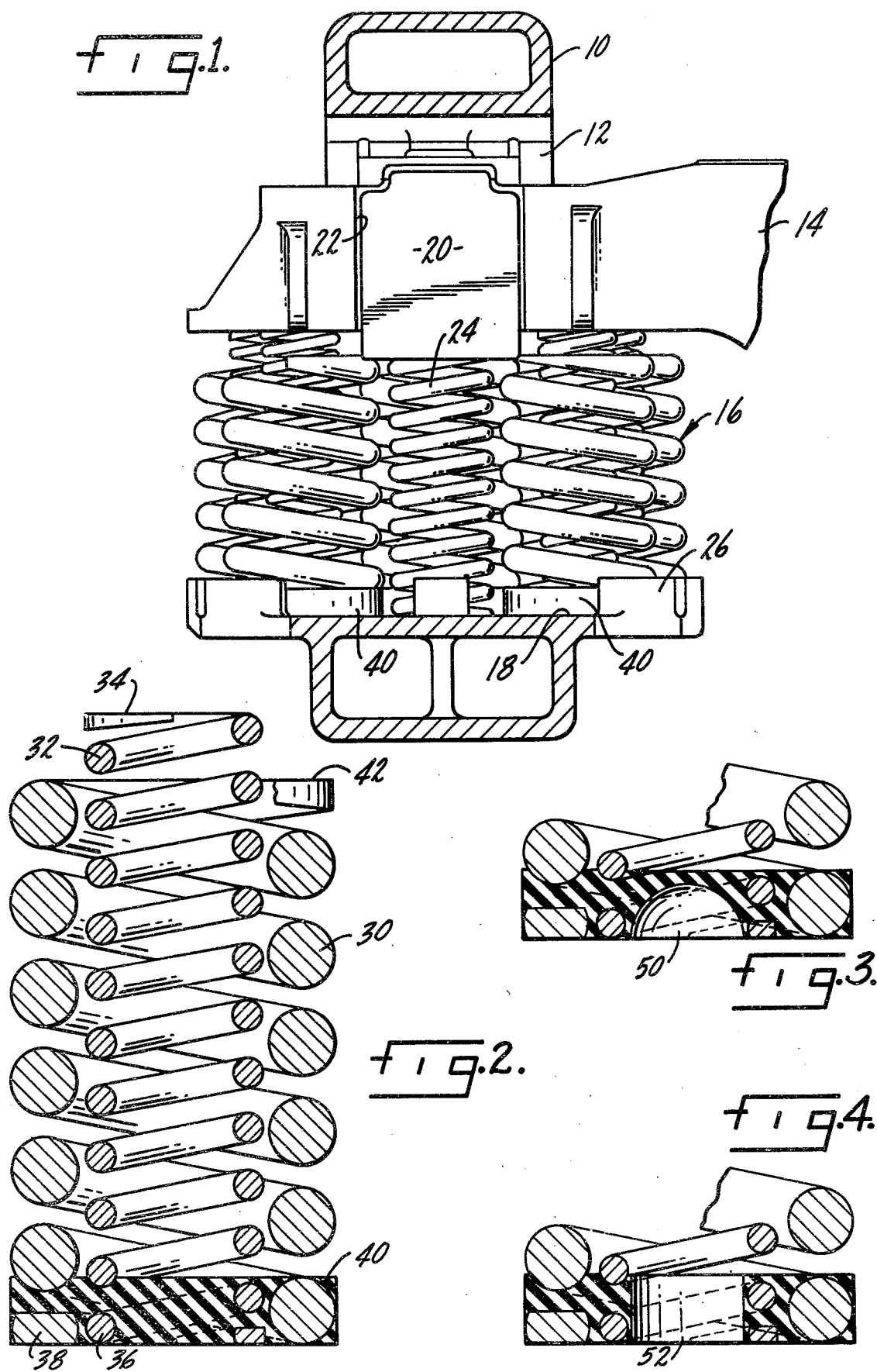

DUAL RATE SPRING WITH ELASTIC SPRING COUPLING

SUMMARY OF THE INVENTION

The present invention relates to improvements in the spring suspension system of railway vehicles (cars) and in particular to means for mounting coaxial load springs on which the vehicle body is supported.

One purpose of the invention is a spring unit for the use described in which only the lower portions of the coils of the coaxial load springs are yieldingly bonded together by an elastomeric material.

Another purpose is a spring unit of the type described including primary and secondary springs in which only the primary springs are used when the vehicle is empty or lightly loaded.

Another purpose is a spring unit of the type described in which the secondary springs are attached to the primary springs so as to be held in position against bouncing or misalignment under vibration due to the train movement.

Another purpose is an economical and reliable spring unit of the type described that prevents the mismatching of springs during assembly of parts.

Another purpose is a spring unit for the described use consisting of multiple nested springs having differing deflections per pound of load and in which only the primary springs are trapped between the bolster and side frame in lightly loaded and unloaded car conditions.

Other purposes will appear in the ensuing specification, drawings and claims.

BRIEF DESCRIPTION OF THE DRAWINGS

The invention is illustrated diagrammatically in the following drawings wherein:

FIG. 1 is a partial view of a railroad car truck illustrating the spring connection between the bolster and a side frame, FIG. 2 is an enlarged vertical section through a spring unit of the type described, FIG. 3 is a partial enlarged vertical section illustrating a modified spring unit, and FIG. 4 is a partial enlarged vertical section illustrating yet a further form of spring unit.

DESCRIPTION OF THE PREFERRED EMBODIMENT

It has long been known in the railroad field that the problem of "hunting" or relative oscillating movement about the vertical axis between the car truck and the car body can to some extent to restrained by a spring suspension which is under a relatively greater amount of deflection. "Hunting", which is particularly a phenomenon of empty of lightly loaded cars, is also related to the rocking frequency which is also restrained by greater deflection. Thus, the present invention by reason of relatively greater deflection of the active springs under empty or lightly loaded cars restrains hunting in trucks and rocking of car bodies.

Customarily in spring units of the type described the longer or primary springs are firmly held in place by reason of their loading, but the secondary springs are only held when the car is more heavily loaded. This leaves the secondary springs free to vibrate or bounce and become misaligned during empty or lightly loaded car conditions. The construction of the present invention bonds the springs in each unit together at their lower ends, thereby eliminating the problem of displacement of those springs when they are not under load.

Referring to FIG. 1 (which is one form of railway car truck), a side frame is indicated generally at 10 and will conventionally have a window 12 to receive one end of a bolster 14.

A plurality of spring units indicated generally at 16 are seated upon the side frame spring seat surface 18 and support the bolster in the side frame window. A typical dampening wedge 20 is supported in a bolster wedge pocket 22 by a wedge support spring 24 in the customary manner.

Spring units 16 are positioned on side frame spring seat surface 18 by exterior lugs or the like 26, which keep the units in place. The described construction, other than the spring units hereinafter detailed, may be any of the conventional types.

The spring units are shown in enlarged form in FIG. 2 and include a primary spring 32 and a secondary spring 30. Primary spring 32 is longer than spring 30. Spring ends 34 and 42 are flattened in the usual manner. The bottom coils 36 and 38 of springs 32 and 30, respectively, are seated upon the side frame spring seat surface 18 and are bonded together or encased within a rubber or elastomeric material indicated at 40. The bonding agent 40 provides a yielding but yet positive connection between the lower coils of the two springs.

When the empty or lightly loaded car is being operated, springs 32 alone support the entire loading leaving springs 30 unloaded with their upper ends free. Since the lower ends of both springs are bonded together and springs 32 are firmly held in place by reason of loading, springs 30 cannot bounce or become misaligned.

The bonding material holds springs 32 and 30 together preventing any undesirable relative movement between the two. When the car is in a loaded condition springs 32 are compressed to the point where both springs 32 and 30 are supporting the load and there is no possibility of either of the springs moving out of position during operation.

In the construction of FIG. 3 there is a center recess 50 in the elastomeric bonding material 40 to provide for internal mounting of the spring unit in contrast to the external mounting of FIG. 2.

FIG. 4 shows an additional form of spring unit arranged for internal mounting. A central cylindrical recess 52 in bonding material 40 is of a size and shape to accomodate a projection on side frame spring seat surface 18.

In some applications there may be a combination of both internal and external mounting depending upon the particular placement of the spring unit.

The invention should not be limited to a spring unit positioned as in FIG. 1. Multiple nested springs of the type described can be used in various ways to support the car. For example, such units may be positioned over the ends of the axles wherein a mounting for the springs is carried upon the journal bearing of an axle and the springs are placed between the mounting and the side frame or between the mounting and the car body.

Although the invention has been described as having a pair of coaxial springs of different lengths, it should be understood that more than just a pair of springs per unit may be used when more than two stages of support are desired to meet certain special conditions.

Whereas the preferred form of the invention has been shown and described herein, it should be realized that there may be many modifications, substitutions and alterations thereto.

The embodiments of the invention in which an exclusive property or privilege is claimed are defined as follows:

1. A railroad car truck including spaced windowed side frames and a bolster, a plurality of spring units supporting said bolster in the windows of said side frames, each of said spring units including coaxial primary and secondary springs, said primary springs having a greater axial length than said secondary springs, the lower coils of the primary and secondary springs of each unit being yieldingly bonded together by an elastomeric material at their coterminating lower ends which seat upon the side frame, with the primary springs alone supporting the bolster in lightly loaded or unloaded car conditions.

2. The structure of claim 1 further characterized in that said primary spring is positioned inside of said secondary spring.

3. The structure of claim 1 further characterized in that said primary springs are trapped between the bolster and side frame with said secondary spring upper coil being out of contact with said bolster in lightly loaded or unloaded car conditions.

4. A spring unit for use between car truck load carrying members including multiple nested coaxial springs, only one of said springs being trapped between the load carrying members in lightly loaded or unloaded car conditions, the spring coils supported on a load carrying member being yieldingly bonded together with an elastomeric material.

5. The structure of claim 4 further characterized in that said primary and said secondary springs differ in deflection per pound of load.

* * * * *